United States Patent [19]
Subramanian et al.

[11] Patent Number: 5,179,053
[45] Date of Patent: Jan. 12, 1993

[54] TREATING EXHAUST FROM A COMPRESSED NATURAL GAS-FUELED ENGINE

[75] Inventors: Somasundaram Subramanian, Melvindale; Robert J. Kudla, Warren; Mohinder S. Chattha, Northville, all of Mich.

[73] Assignee: Ford Motor Company, Dearborn, Mich.

[21] Appl. No.: 789,558

[22] Filed: Nov. 8, 1991

[51] Int. Cl.⁵ .............................................. B01J 29/30
[52] U.S. Cl. ....................................... 502/65; 502/66; 423/213.5
[58] Field of Search .................... 502/66, 65, 71, 74, 502/303; 423/213.5, 245.3, 247

[56] References Cited

U.S. PATENT DOCUMENTS

| | | | |
|---|---|---|---|
| 4,297,328 | 10/1981 | Ritscher et al. | 423/213.2 |
| 4,791,091 | 12/1988 | Bricker et al. | 423/213.5 |
| 5,021,389 | 6/1991 | Chattah et al. | 423/213.5 |
| 5,051,244 | 9/1991 | Dunne et al. | 423/239 |
| 5,063,192 | 11/1991 | Murakami et al. | 423/213.5 |

FOREIGN PATENT DOCUMENTS 142859 5/1985 European Pat. Off. ............ 502/303

*Primary Examiner*—Carl F. Dees
*Attorney, Agent, or Firm*—Joseph W. Malleck; Roger L. May

[57] ABSTRACT

A catalyst system that converts the exhaust gas of a compressed natural gas (CNG) fueled automotive engine when operated at stoichiometry or slightly lean thereof, at highly enhanced rates, and having: (a) a first stage catalyst comprising a transition metal-containing zeolite (Cu-ZSM5), and (b) a second stage catalyst for treating the effluent of the first stage and comprising palladium supported on high surface area gamma alumina. The second stage catalyst has the alumina support impregnated with an intimate mixture, by weight, of 0.5–20% $La_2O_3$ and 0.2–30% palladium.

A method of treating exhaust gases from a CNG-fueled engine, comprising: (a) operating the engine at stoichiometry or slightly lean (0.85–1.0 R) thereof; (b) exposing such exhaust gases to a first stage catalyst consisting of a copper-ZSM5 zeolite having at least 3% by weight ion exchange copper; and (c) exposing the effluent from the first stage to a second stage comprising a gamma alumina support catalyst impregnated with palladium and other catalyst enhancing oxides.

10 Claims, 4 Drawing Sheets

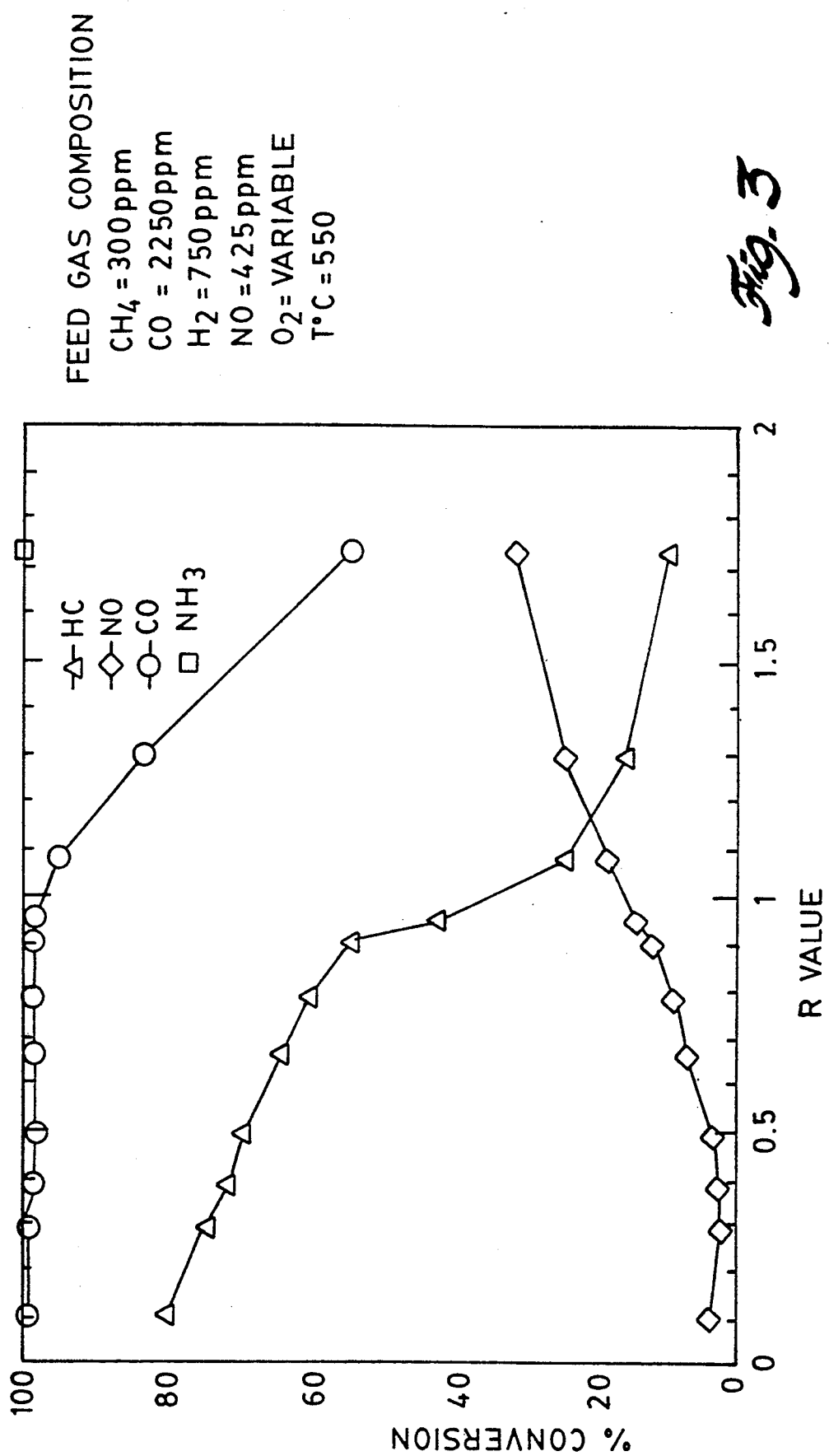

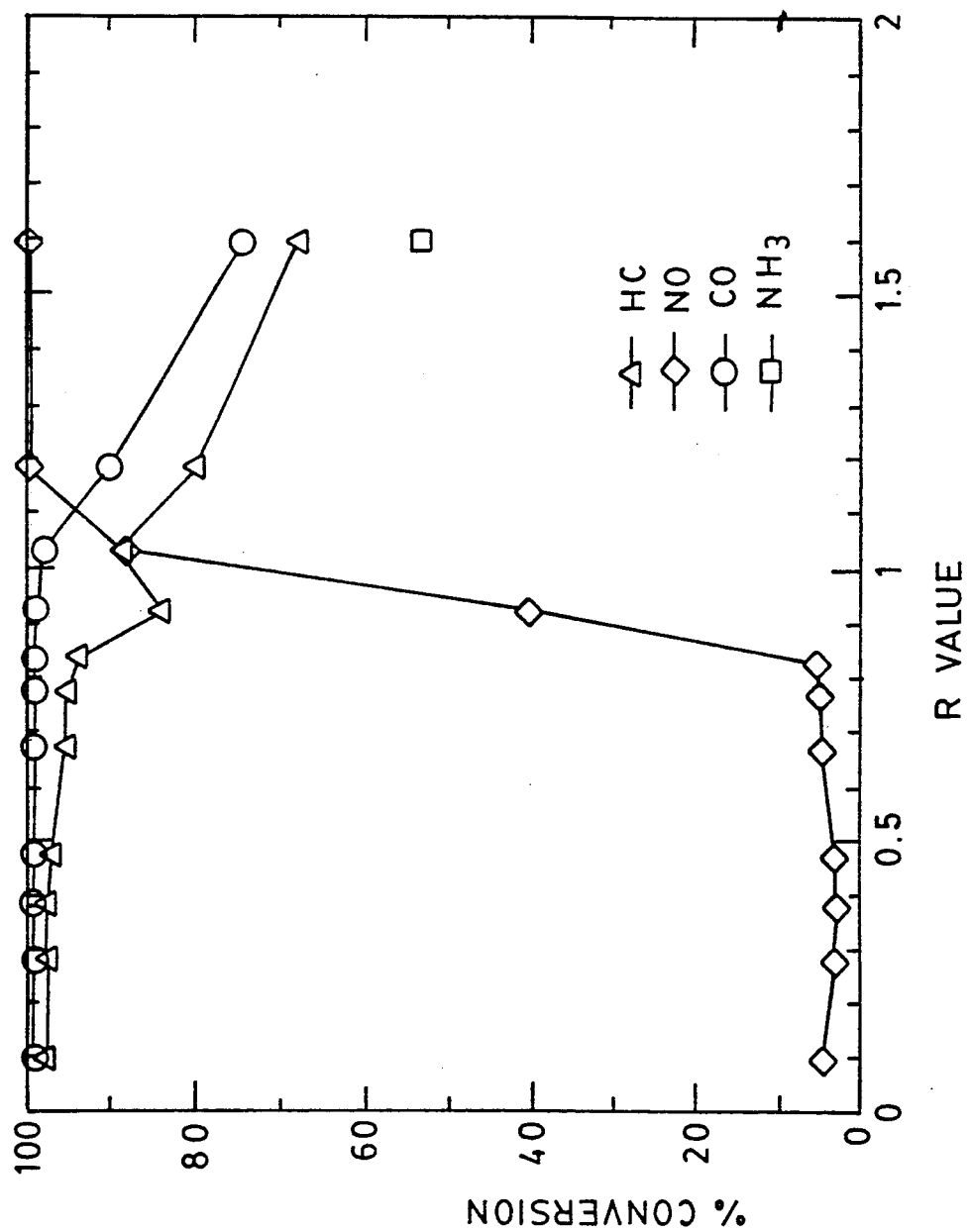

000
TREATING EXHAUST FROM A COMPRESSED NATURAL GAS-FUELED ENGINE

BACKGROUND OF THE INVENTION

1. Technical Field

This invention relates to the technology of catalytically converting emissions of a compressed natural gas (CNG) fueled engine, and more particularly to the technology for converting such exhaust gases when the combustion process for such engine is operated at or slightly lean of stoichiometry.

2. Discussion of the Prior Art

Natural gas (essentially 85% methane) is an attractive source of fuel for vehicles because it provides for a lower fuel cost, longer engine life, lower maintenance, and reduced oil consumption. Development of catalysts for high efficiency removal of saturated hydrocarbons, which includes methane, by oxidation within an exhaust stream is of strategic importance; it may be crucial in view of the emission control requirements promulgated by the U.S. Government. In the past, oxidation of methane has received little attention in automotive catalysis. Extreme difficulty of removal of methane is experienced because a C—H bond must be ruptured. In the oxidation of higher alkanes, oxidation is easily achieved by cleavage of C—C bonds. Since the C—H bond is stronger, methane is more difficult to oxidize.

In copending U.S. Ser. No. 07/772,318, filed Oct. 7, 1992 authored by some of the authors of this invention and commonly assigned to the assignee herein, a catalyst is disclosed which enhances the three-way conversion capability of a modified $Pd/Al_2O_3$ catalyst in treating the exhaust gas of a compressed natural gas-fueled engine, provided the engine is limited to being operated slightly rich of stoichiometry, i.e., 1.1-1.2 R (R being the ratio of reducing components to oxidizing components in the exhaust gas). Although this is a significant achievement over the prior art, fuel-rich operation affects the fuel economy of operating the CNG fueled engine and therefore can be undesirable. At stoichiometry or below, the conversion capability of such catalyst drops dramatically.

Zeolite catalysts have been found useful for converting nitric oxide contained in the exhaust of a conventional gasoline-fueled engine, particularly when the combustion process is lean (possessing a high excess oxygen content in the exhaust gas). One of the earliest applications of high silica zeolites to the purification of a conventional gasoline-fueled engine exhaust is disclosed in U.S. Pat. No. 4,297,328, wherein a copper-exchanged zeolite is deployed. Copper is most effective as the ion exchange metal because it is more active at lower temperatures than other metals known to date. Such catalyst performed only in an oxidizing environment.

U.S. Ser. No. 07/753,780, filed Sep. 3, 1991, authored by some of the inventors herein and commonly assigned to assignee of this invention, disclosed a modification to such catalyst to prevent it from degrading at high temperatures, usually found in automotive exhaust systems, and to enhance the catalytic activity of copper-exchanged zeolites. Such prior art knowledge has not extended to the use of zeolites for conversion of exhaust gas of a compressed natural gas engine nor to the use of such catalyst when the engine is calibrated at stoichiometry or slightly lean thereof. This is an important differentiation because the exhaust gas from a conventional gasoline-fueled engine will contain considerably more hydrocarbon (HC), nitric oxide (NO), carbon monoxide (CO) concentration compared to the exhaust gas from a CNG-fueled engine (see Table I). Therefore, the ability of a zeolite catalyst to provide any successful degree of conversion for a CNG-fueled engine has not been envisioned and likely would not operate properly based upon data to date.

SUMMARY OF THE INVENTION

The invention is a catalyst system that converts the exhaust gas of a compressed natural gas (CNG) fueled automotive engine when operated at stoichiometry or slightly lean thereof, at highly enhanced rates. This system comprises: (a) a first stage catalyst comprising a transition metal-containing zeolite, and (b) a second stage catalyst for treating the effluent of the first stage and comprising palladium supported on alumina. Optimally, the zeolite is of the copper ion-exchange type, preferably Cu-ZSM5, having at least 3% and optimally about 5% copper exchanged by weight of zeolite. Copper is exchanged for sodium, hydrogen, or ammonium ions in the zeolite. Advantageously, the second stage catalyst is a high surface area gamma alumina support impregnated with an intimate mixture, by weight, of 0.5-20% $La_2O_3$ and 0.2-30% palladium. The lanthana is applied discontinuously on the support and may be substituted at least in part by other equivalents such as tungsten oxide or molybdenum oxide.

The invention also comprehends a method of treating exhaust gases from a CNG-fueled engine, the method comprising: (a) operating the engine at stoichiometry or slightly lean thereof; (b) exposing such exhaust gases to a first stage catalyst consisting of a copper-ZSM5 zeolite having at least 3% by weight ion exchange copper; and (c) exposing the effluent from the first stage to a second stage comprising a gamma alumina support catalyst impregnated with palladium and other catalytic activity and durability enhancing oxides.

BRIEF DESCRIPTION OF THE DRAWINGS

FIG. 3 is a graphical illustration of percent conversion efficiency as a function of R value for the first stage catalyst of this invention used alone; and FIG. 4 is a graphical illustration of percent conversion efficiency as a function of R value for the total catalyst system of this invention.

DETAILED DESCRIPTION AND BEST MODE

Figure 1:
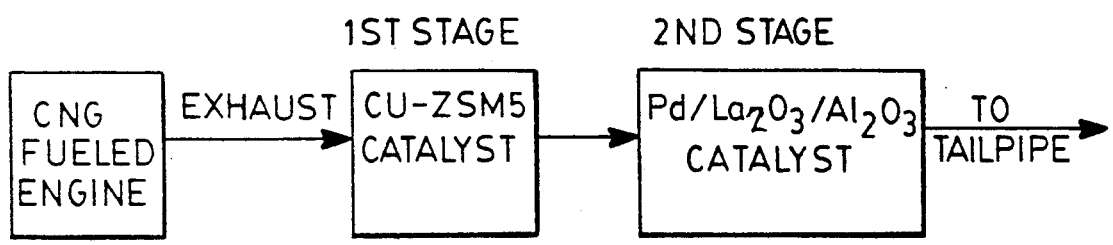
FIG. 1 is a block diagram illustrating the preferred arrangement of elements of the catalytic system of this invention.

In the inventive catalytic system of this invention, the first stage of the catalyst comprises a zeolite-based catalyst, preferably copper-ZSM5, followed by a three-way catalyst comprised of palladium supported on a high surface area alumina substrate (preferably discontinuous lanthana supported on gamma alumina along with impregnation of palladium thereon).

Zeolite Catalyst

The catalyst contains a transition metal-containing zeolite; the zeolite is desirably a high silica zeolite having a $SiO_2/Al_2O_3$ molar ratio which exceeds about 10, preferably up to about 60 (see U.S. Pat. No. 4,297,328, which is expressly incorporated herein by reference, for teaching of other zeolites or class of zeolites that may be used herein).

The transition metal, such as copper, is provided into the zeolite by ion-exchange. Again, the transition metal may be selected from the group consisting of Cu, Co, Ni, Cr, Fe, Mn, Ag, Zn, Ca, and compatible mixtures thereof. Generally, a sodium, hydrogen, or ammonium zeolite is contacted by an aqueous solution of another cation, in this case an aqueous solution of soluble copper compound such as copper acetate, wherein replacement of the sodium, hydrogen, or ammonium ion by copper ion takes place. It is advantageous to provide as much transition metal ion in the zeolite as possible since the amount of transition metal present in the zeolite is directly related to the catalytic activity of the first stage. Preferably, this is at least 3% by weight of zeolite, up to a maximum determined by the $SiO_2/Al_2O_3$ ratio. After replacing the sodium, hydrogen, or ammonium ion with the metal ion, the zeolite is generally washed to remove excess surface transition metal compound. It is not necessary to do so, however.

The first stage catalyst may also contain a transition metal-containing oxide, but such transition metal should be of the same type as that used in the ion exchange for the zeolite. Preferably, this transition metal is copper and copper is particularly preferred because it is active at lower temperatures. Preferably, the oxide is zirconia and the metal it contains is copper, although other oxides such as titania, silica, zirconia, and very minor proportions of lanthana aluminate may be employed. One method of making a copper-containing zirconia comprises soaking a quantity of zirconia, in the form of a fine powder, repeatedly, if desired, in a solution of copper compound, subsequently dried, then calcined at an elevated temperature between 300°-600° C., often at about 450° C. The copper compound should be one that is soluble or that can be dispersed in a liquid, that is, those which are soluble in an aqueous solution or which can be solubilized therein, e.g., with the aid of an acid or base. Exemplary of such copper compounds are copper salts like copper nitrate and copper sulfate; organo-copper compounds like carboxylates of copper, copper acetate, and copper-cupric amines; organo-complexes of copper like diamine copper acetate; tetraamine copper sulfate, and copper acetylacetonate. Soluble compounds, exemplary of other transition metal compounds include cobalt acetate, nickel acetate, ferric chloride, chromic nitrate, and manganese acetate.

The saturated zirconia is then dried and calcined in air, the copper compound decomposing to form copper oxide. Preferably, copper is present in an amount between 0.1-20% by weight in the copper-containing oxide. Each of the copper-containing oxide and the copper-containing zeolite may be ground to a fine powder, mixed together, and a slurry formed of them, and then applied to a substrate such as a metal or ceramic honeycomb. While it is preferable to make the catalyst in this way, it may be made by layering one material onto another.

CNG/Three-Way Catalyst

The second stage catalyst functions three ways (CO, HC, and NO) to cleanse the exhaust effluent from the first stage when operated under stoichiometric or slightly lean conditions. The catalyst comprises a high surface area gamma alumina support. Optimally, gamma alumina is impregnated with 0.5-20% lanthanum oxide ($La_2O_3$) or its equivalent. The lanthana impregnated alumina is further impregnated with palladium in an amount of 0.2-30% by weight of alumina. The operation of such second stage will be described with that optimum catalyst in place. The support predominantly consists of gamma alumina rather than delta or alpha forms of alumina because it provides, among other factors, a greater surface area. With gamma alumina, the surface area will be significantly increased and be in the range of 50-400 m2/gm. The particle size of the gamma alumina should be preferably less than 200 angstroms and the monolith carrier should have a cell size in the range of 100-600 cells per square inch. Gamma alumina may also be modified with oxides of base, rare earth, and alkaline metal such as barium, cerium, titanium, and nickel to promote washcoat adhesion, thermal stability, and catalytic activity.

Lanthana impregnation is carried out to load the support with lanthana in the weight range of 0.5-20%. If lanthana is added in an amount less than such range, then the beneficial effect of increase in activity due to the lanthana addition is not observed. If lanthana exceeds such range, then the support surface area will decrease and little or no additional benefit is derived. It is important that the lanthana be applied in a discontinuous mode to the support so that both the palladium and lanthana are simultaneously exposed to the exhaust gas. Elements that are partial equivalents to the function of lanthana for purposes of this invention may include tungsten oxide and molybdenum oxide. The conversion efficiency enhancement will be less with either of such latter oxides; therefore, it is desirable if only a portion of $La_2O_3$ is replaced by $WO_3$ or $MoO_3$.

Palladium is impregnated in a manner to provide the presence of large crystalline particles, preferably in the particle range of 20-1000 angstroms. With palladium weight loadings below 0.2%, there will be an insufficient catalysis effect and therefore not promote the objects of this invention. If the palladium loading is in excess of 30%, the palladium surface area decreases and no additional benefit from palladium addition is derived.

Other elements that may be present in the second stage catalyst may include elements that avoid retention of water for improving the long-life stability of catalysts. This may include elements such as tungsten oxide (incorporated by using ammonium meta tungstate during the impregnation process) or chromium oxide, both of which tend to prevent oxidation of palladium by reducing the mobility of water and thereby keeping it away from the palladium.

The invention also comprehends a method of treating exhaust gases from a CNG-fueled engine, the method comprising: (a) operating the engine at stoichiometry or slightly lean thereof; (b) exposing such exhaust gases to a first stage catalyst consisting of a copper-ZSM5 zeolite having at least 3% by weight ion exchange copper; and (c) exposing the effluent from the first stage to a second stage comprising a gamma alumina support catalyst impregnated with palladium and other catalyst enhancing oxides. Slightly lean is used herein to mean a redox ratio of 0.85-1.0.

Performance

First and second stage catalysts were independently and separately prepared.

The first stage catalyst was formed by using a commercially available ZSM5 zeolite catalyst and contacting it with an aqueous solution of copper nitrate (under controlled pH) to exchange 5% by weight of copper. The resulting material was dried at 120° C. The 5% Cu/ZSM5 powder was suspended in an aqueous slurry and deposited on a monolithic cordierite substrate. The resulting material was dried and calcined at 450° C. to form the 5% Cu/ZSM5 catalyst.

The second stage catalyst was prepared by using a prewashcoated monolithic cordierite substrate, containing predominantly gamma alumina, and relatively small amounts of alpha alumina, nickel oxide with nickel being present in an amount of 0.56-0.84% by weight of the washcoat, cerium oxide with cerium being present in an amount of 0.15-0.24% by weight, lanthana with lanthanum being present in an amount of 0.19% by weight, and titania with titanium being present in an amount of 0.22-0.35% by weight. Whether a prewashcoated substrate is used or not, the fresh catalysis data presented will not change; he precoat affects only long-life durability. The prewashcoated substrate was dipped in an aqueous solution of lanthanum nitrate to discontinuously deposit 10% lanthana by weiqht of the washcoat system. The substrate was dried at 120° C. and calcined at 600° C. The substrate was then dipped in an aqueous solution of palladium chloride containing 4% by volume $HNO_3$ to deposit 1% palladium by weight of the washcoat system. The precursor was dried at 120° C. and calcined at 600° C. to form a three-way catalyst.

The catalysts were separately analyzed in flow reactors under conditions used to simulate CNG vehicle exhaust: 300 ppm $CH_4$, 2250 ppm CO, 750 ppm H2, and 425 ppm NO at 550° C. The $O_2$ concentration was varied and $N_2$ was used as the carrier gas.

Figure 2:
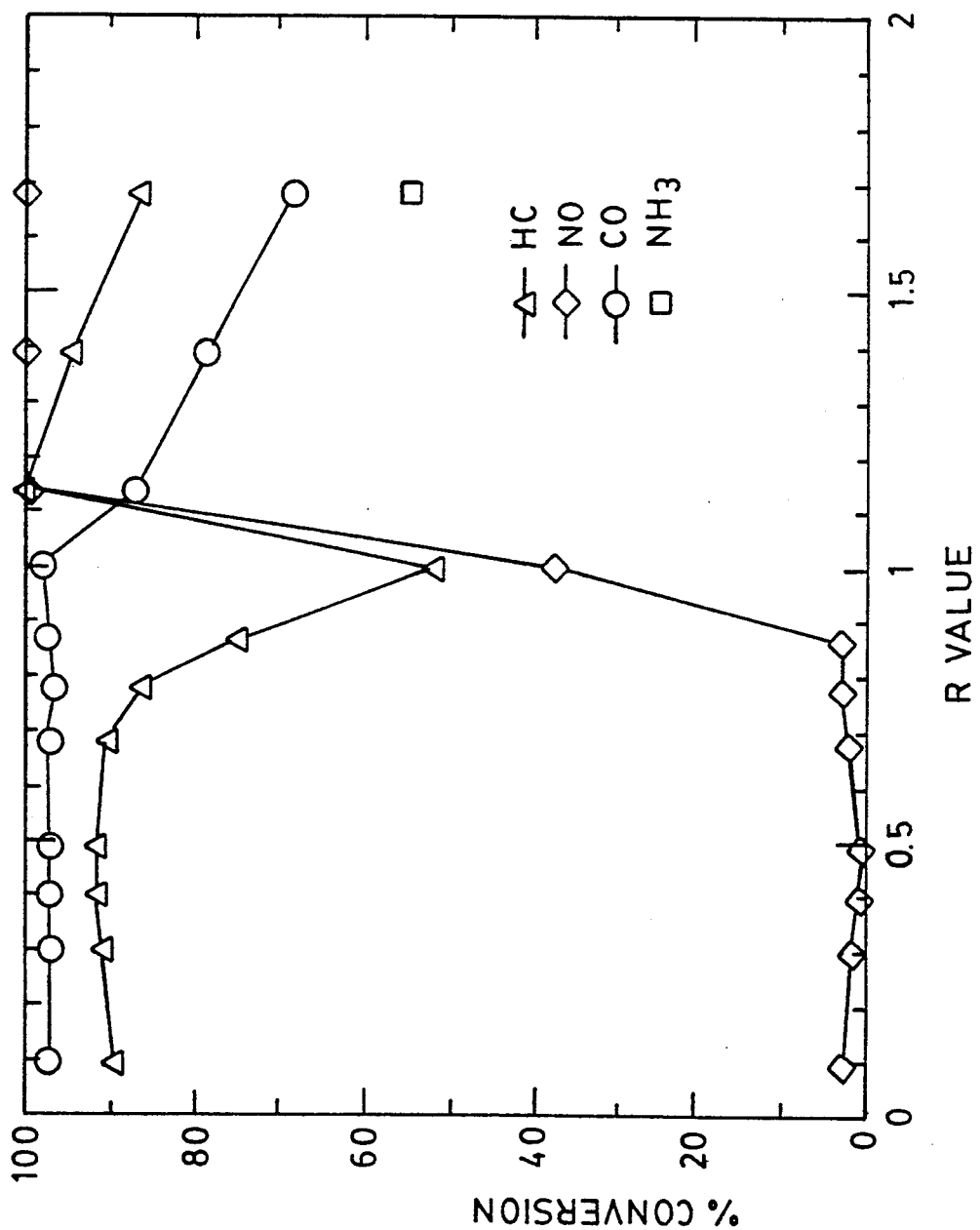
FIG. 2 is a graphical illustration of percent conversion as a function of R value for the second stage catalyst of this invention used alone.

As shown in FIG. 2, when using the second stage catalyst by itself, methane conversion efficiency at stoichiometry was only 50%, nitric oxide conversion efficiency at stoichiometry was 37%, and carbon monoxide conversion efficiency was 100%. If the second stage catalyst were to be operated slightly rich of stoichiometry, the conversion efficiency of methane would rise significantly and similarly the NO conversion efficiency would rise significantly. However, operating the vehicle under rich conditions is economically unsatisfactory.

As shown in FIG. 3, when using the first stage catalyst by itself, the results illustrate that at stoichiometric conditions methane conversion will be substantially poorer, about 37% at stoichiometry, and the NO conversion will be at about 19% at stoichiometry. The methane conversion values are lower than those observed for the independent second stage catalyst; the first stage catalyst does not show a minimum in the methane conversion efficiency as that for the separate second stage catalyst. The first stage catalyst shows 10-20% nitric oxide conversion at R values between 0.8-1.0; this is particularly disappointing.

As shown in FIG. 4, when such first and second stage catalysts are combined in the proper sequence, there is a synergistic enhancement in the conversion efficiency for all three of the elements to be converted. The methane conversion efficiency does not show a minimum methane, and carbon monoxide conversion values are higher than 70% over the entire R range. In addition, at a given R value, such as stoichiometry, the nitric oxide conversion levels are higher than those observed for the second stage catalyst alone. The methane, carbon monoxide, and nitric oxide conversion efficiencies at stoichiometry are respectively 86% for methane, 75% for nitric oxide, and 100% for carbon monoxide. Thus, the conversion efficiencies for all three components are higher than 75% at the stoichiometric point. The combined system of this invention provides other advantages: (i) relatively high methane conversion values from R =0.1 to 1.5, (ii) absence of a minimum in the methane conversion, and (iii) relatively high nitric oxide conversions when at or slightly lean of stoichiometry.

TABLE I

| CNG | | GASOLINE | |
|---|---|---|---|
| $CH_4$ | 300 ppm | $C_3H_8$ | 500 ppm |
|  |  | $C_3H_6$ | 1,000 ppm |
| NO | 425 ppm | NO | 1,000 ppm |
| CO | 2250 ppm | CO | 15,000 ppm |
| $H_2/CO$ | 0.5-0.33 | $H_2/CO$ | 0.33 |
| $SO_2$ | up to 2 ppm | $SO_2$ | 20 ppm |

We claim:

1. A three-way catalyst system for efficiently converging the exhaust gas from a CNG-fueled internal combustion engine when operated at stoichiometry or slightly lean thereof, the system comprising:
   (a) a first stage catalyst comprising a transition metal-containing zeolite treating high content methane exhaust gases;
   (b) a second stage catalyst for treating, in series only, the effluent from the first stage catalyst and comprising alumina impregnated with palladium.

2. The system as in claim 1, in which said second stage catalyst comprises substantially gamma alumina impregnated with 0.5-20% $La_2O_3$ and 0.2-30% palladium.

3. The system as in claim 1, in which said lanthana is discontinuously coated on said alumina.

4. The system as in claim 1, in which said first stage is a high silica zeolite supported on a monolith, and a transition metal selected from the group consisting of copper, cobalt, nickel, chromium, iron, manganese, silver, zinc, calcium, and compatible mixtures thereof, is exchanged on the zeolite.

5. The system as in claim 1, in which said zeolite has a $SiO_2/Al_2O_3$ molar ratio greater than 10.

6. The system as in claim 1, in which said second stage catalyst comprises high surface area alumina.

7. The system as in claim 1, in which said first stage catalyst is copper ion-exchanged zeolite containing at least 3% by weight copper.

8. The system as in claim 1, in which said second stage catalyst contains palladium in a crystalline form having a crystal size in the range of 20-1000 angstroms and the palladium/lanthanum ratio is in the range of b 0.1-60.

9. A catalyst system for efficiently converting methane from a CNG-fueled engine when operated over a range of R values from 0.1-1.5, the system comprising:
   (a) a first stage catalyst comprising a transition metal-exchanged zeolite; and
   (b) a second stage catalyst for treating in series only, the effluent from the first stage and comprising a palladium catalyst supported on alumina.

10. The system as in claim 9, in which said first stage catalyst consists of a copper-exchanged zeolite having at least 3% by weight copper and the second stage catalyst is comprised of gamma alumina substrate impregnated with 0.5-20% lanthana and 0.2-30% palladium.

* * * * *